Figure 1:
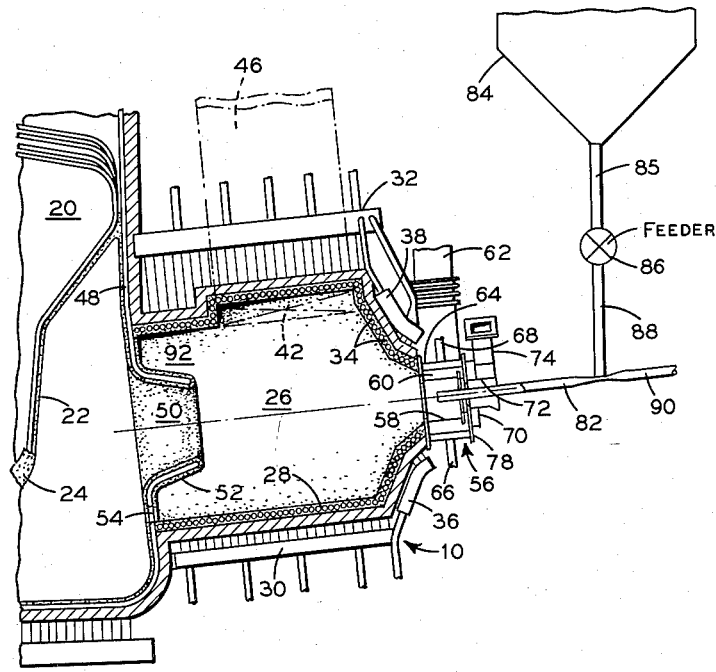

Feb. 14, 1961  W. L. SAGE  2,971,480
CYCLONE FURNACE
Filed Oct. 8, 1957

INVENTOR.
Warnie L. Sage
BY
*J.P. Moran*
ATTORNEY

United States Patent Office 2,971,480
Patented Feb. 14, 1961

2,971,480
CYCLONE FURNACE

Warnie L. Sage, Louisville, Ohio, assignor to The Babcock & Wilcox Company, New York, N.Y., a corporation of New Jersey Filed Oct. 8, 1957, Ser. No. 688,891

6 Claims. (Cl. 110—28)

The present invention relates in general to the construction and operation of apparatus for burning ash-containing solid fuel and more particularly to the construction and operation of a cyclone type furnace designed for the burning of an ash-containing crushed or granular fuel, the converting of fly ash separated from the gases leaving the cyclone furnace or other types of ash-containing solid fuel fired furnaces into molten slag and the recovery of heat from any carbon included in the fly ash.

The term "fly ash" is defined as the fine particles of ash, including generally small amounts of carbon, carried from the furnace by the products of combustion. Fly ash containing carbon represents a decrease in operating efficiency and thereby an economic loss. Further, the handling and disposal of fly ash is becoming an increasing problem for industrial and central station power plants. The market for fly ash is limited, and when marketable, it is necessary to provide equipment to satisfactorily package or load the relatively light fly ash. This makes the cost of handling the fly ash comparatively expensive. On the other hand, in many localities there is a market for heavy slag formed by the quenching of molten ash for road sanding, shingle coating, fill and other related purposes.

Previous attempts have been made to return fly ash to a cyclone furnace and melt it therein but the results have been uniformly unsatisfactory because of high erosion wear by the fly ash on the inner surfaces of the cyclone furnace, with consequent increase in maintenance, high air pressure requirements for the introduction of the fly ash, relatively low rates of retention of fly ash as slag and, in some cases, loss of ignition.

The present invention provides for a cyclone furnace wherein a fly ash inlet is so constructed and arranged relative to the fuel and combustion air inlets that a high proportion of the fly ash is melted and removed as a slag, any carbon in the fly ash is burned, fly ash erosion on the inner surfaces of the cyclone furnace is minimized, the air pressure required to introduce the fly ash into the cyclone furnace is at a relatively low level and continuous and stable ignition is assured over a wide range of fuel burning rates.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

Figure 2:
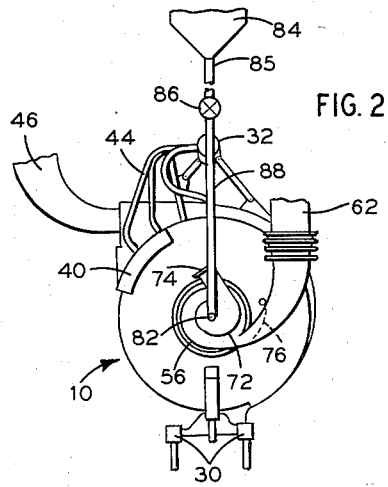

In the drawings:

Fig. 1 is a partly diagrammatic sectional elevation of a steam generating unit constructed in accordance with the invention; and Fig. 2 is a front view of the cyclone furnace and fly ash supply system.

The steam generating unit illustrated in part in Fig. 1 comprises as its main parts a cyclone type furnace 10 which is fired by a crushed or granular fuel, such as bituminous or semi-bituminous coal. The products of combustion from the cyclone furnace flow into a secondary furnace 20 containing a reflecting arch 22 and slag screen 24 with which the products of combustion successively contact. The gaseous products of combustion flow upwardly in the secondary furnace to a convection heating section of the unit, not shown.

The cyclone furnace 10 comprises a horizontally elongated combustion chamber 26 of substantially circular cross-section, the circular boundary wall being formed by closely spaced studded tubes 28 covered by a layer of refractory material, each tube having a semi-circular bent portion and adjacent tubes having their bent portion oppositely arranged to form the circumferential wall. The lower ends of the wall tubes are connected to interconnected supply headers 30 and their upper ends to a discharge header 32. The cyclone furnace is preferably set with its longitudinal axis at a slight angle to the horizontal to facilitate draining of molten slag into the secondary furnace. The outer end portion of the cyclone furnace is tapered outwardly in cross-section and formed by closely spaced circular studded tubes 34 of progressively smaller diameter connected to a make-up header 36 and a riser header 38, the latter being connected to the discharge header 32. The circular tubes 34 thus form a double frusto-conical section symmetrically arranged relative to the combustion chamber axis.

Combustion chamber wall tubes 28 along one side are bent radially outwardly along an involute curve for a major portion of the combustion chamber length starting at the inner end of the tapering portion of the chamber, while the corresponding tubes along the opposite side are bent outwardly and connected to an intermediate outlet header 40, thus cooperating to define an axially elongated secondary air inlet port 42. The header 40 is connected to the discharge header 32 by riser tubes 44. A main air duct 46 of substantially rectangular cross-section leading from a forced draft fan, not shown, terminates in a transversely tapering curved section opening to the secondary air port 42. The lower portion of the duct 46 is subdivided by vertical partitions into a series of side-by-side sections extending longitudinally of the furnace chamber. Each duct section is provided with a damper for controlling the velocity of the corresponding secondary air stream while maintaining the entering air stream at all times along the combustion chamber wall.

The rear end of the combustion chamber 16 is partly closed by a fluid cooled wall 48 having a gas outlet 50 in the form of a re-entrant throat 52 arranged therein concentric with the combustion chamber axis. A slag outlet 54 is formed in the wall 48 at a position below the throat 52 for the continuous discharge of molten slag. The wall 48 forms part of the fluid cooled boundary walls of the secondary furnace chamber 20. It is to be understood that the portions of the fluid circulation system described are suitably connected into the natural circulation system of the steam generating unit.

A fuel inlet chamber or burner 56 of substantially circular cross-section and of smaller diameter than the combustion chamber 16 is arranged at the front end of and concentrically opens to the combustion chamber. A filler member or deflector 58 of circular cross-section is arranged radially inwardly from the circumferential wall of the burner 56 and defines therewith a circumferentially continuous annular space 60 opening at one end directly to the combustion chamber 26. The coal, in crushed or granulated form, together with preheated primary air under a relatively high positive pressure, is directed by an involute curved primary air-coal pipe 62 tangentially into the annular space 60 at a high angular velocity for movement therethrough to the combustion chamber 26. The effective flow area of the pipe 62, and thereby the velocity of the fuel-air stream is controlled by a manually operated damper 76. The primary air is supplied by the forced draft fan by way of a branch duct, not shown, connected to the main duct 46. The burner 56 is provided at its outer periphery with a cooling jacket 64 having a water inlet 66 at the bottom and a water outlet 68 at the top.

A circular tertiary air chamber 72 is arranged on the outer end of and concentric with the burner 56 and opens to the interior of the filler member 58. Preheated air is supplied to the chamber 72 by a duct 74 connected to the main duct 46 and controlled by a damper, not shown. The duct 74 has an involute curved connection to the chamber 72, producing a whirling stream of tertiary air which is directed axially of the burner 56 by an orifice plate 78 on the outer end of the burner 56. The whirling tertiary air entering the combustion chamber passes through the interior of the filler member 58 axially and inwardly of the whirling stream of primary air and fuel entering the combustion chamber. A water jacket 70 is formed about the front portion of the chamber 72 and adjacent the outer end of the orifice plate 78.

In accordance with the invention, the cyclone furnace is particularly adapted for the burning of fly ash in conjunction with the burning of a particle-form solid fuel. The fly ash supply system comprises a horizontally arranged conduit or pipe 82 of circular cross-section extending through the outer end of and of smaller diameter than the tertiary air supply chamber 72 and having its discharge end opening concentrically into the fuel inlet chamber 56 within the deflector 58 thereof. A bunker or fly ash collecting hopper 84 is arranged to receive separated particles from solid particle collecting means, not shown, in the gas path beyond the convection heating surface of the steam generating unit. From the bunker 84 the fly ash is discharged through a conduit 85, a suitable regulable feeder, such as a rotary feeder 86, as shown, or a vibrating feeder, and a conduit 88 to the outer end of the conduit 82. Air under a relatively high positive pressure is supplied to the conduit 82 by a conduit 90 preferably leading from the main air duct 46. This air may be supplied from an independent source rather than from the main air duct 46. The fly ash discharging from the conduit 88 is picked up by the stream of air passing from the conduit 90. The fly ash thus suspended then flows through the conduit 82 and discharges therefrom axially into the combustion chamber 26 and axially of the whirling stream of tertiary air and whirling stream of primary air and fuel. The whirling or circular motion of the tertiary air and primary air and fuel streams about and adjacent the discharge end of the conduit 82 tends to form a relatively low pressure zone at their centers and thus permits the use of air at a correspondingly low pressure, this pressure being at least equal to the pressure in this zone and considerably less than the average pressure of the primary and tertiary air streams at their points of introduction into the combustion chamber, to convey the fly ash through the conduit 82 into the combustion chamber 26.

In the operation of the cyclone furnace construction described, preheated air is supplied to the main air duct 46 at a high positive pressure and split into four streams, 15–20 percent being used as primary air, 75–80 percent as secondary air, 3–4 percent as tertiary air and 1–2 percent as carrier air for the fly ash. The total air supplied preferably ranges between 105 and 115 percent of the theoretical combustion requirements. The primary air-fuel stream enters the combustion chamber in a high velocity stream whirling in a clockwise direction with the inner core of tertiary air entering in the same direction and the fly-ash-air stream entering the combustion chamber axially and radially inwardly of the whirling tertiary air. The streams of high velocity secondary air discharging from the secondary air ports 42 tangentially enter the combustion chamber in the same direction of rotation and at the outer side of the whirling stream of primary air and fuel. Combustion of the fuel and the combustible content of the fly ash progresses at a high rate, with a gradual mixing of the secondary air streams with the enclosed streams of primary air and fuel and fly ash. Combustion proceeds at a rate sufficient to maintain a normal mean temperature in the combustion chamber over a wide range of operation substantially above the fuel ash and fly ash fusion temperature. Under such combustion conditions the fly ash and the ash content of the fuel are rapidly reduced to a molten condition and due to the centrifugal effect thereon, the combustion chamber walls will be rapidly coated with a film of molten slag which adheres to the refractory inner face of the walls and provides a sticky surface against which fuel and fly ash particles are thrown and to which they adhere. The high velocity of the burning fuel-fly ash-air mixture causes the gas stream to follow a helical path toward the rear of the combustion chamber where the gas is caused to reverse direction before entering the gas outlet 50. The gas flow reversing action is effected by an annular pocket 92 and facilitates the separation of suspended slag particles from the outgoing gases. The tertiary air is introduced on the inward side of the whirling mass of burning fuel to mix with the fine fuel and fly ash particles and thereby assure combustion of the fine fuel particles while reducing the fine fly ash particles to a molten condition.

With the fly ash, fuel and combustion air entering the combustion chamber as described, the fly ash is softened or reduced to a molten condition before contacting the combustion chamber walls, thereby minimizing abrasive action of the fly ash on the combustion chamber walls and reducing cyclone furnace maintenance. Molten slag, including reduced fly ash and ash in the fuel, resulting from combustion continuously discharges through the outlet 54 into the secondary furnace chamber 20 for flow therefrom to a slag tank, not shown. The gases discharged through the outlet 50 contain little, if any, combustible, combustion of the fuel and any carbon in the fly ash being substantially completed in the combustion chamber. A relatively small amount of fly ash and molten slag is present in suspension in the outgoing gases. By way of example, and not of limitation, in a test run on a cyclone furnace embodying the invention, approximately 80 to 90 percent of the fly ash returned to the cyclone furnace and of the ash in the fuel was tapped out of the cyclone furnace as molten slag. The remainder, which is extremely fine ash, can be collected in a suitable dust collector. The collected fly ash can then be returned to the cyclone furnace and melted into liquid slag. It will be understood that it is also possible to return fly ash to the cyclone furnace from other sources, such as pulverized coal fired units and stoker fired units. In any case, fly ash handling outside the boiler room is eliminated.

While in accordance with the provisions of the statutes I have illustrated and described herein the best form of the invention known to me, those skilled in the art will understand that changes may be made without departing from the spirit of the invention covered by my claims, and that certain features of my invention may sometimes be used to advantage without a corresponding use of other features.

What is claimed is:

1. A cyclone furnace having a combustion chamber of substantially circular cross-section defined by walls having an inner exposed refractory surface; a substantially circular fuel inlet chamber of smaller diameter than and axially opening into one end of said combustion chamber; means for introducing a stream of primary air and slag-forming particle fuel into said fuel inlet chamber at a high velocity and effecting a helical path of travel therein along the circumferential wall of said fuel inlet chamber; means defining a restricted gas outlet at the opposite end of said combustion chamber; means for introducing a high velocity stream of secondary air tangentially to the circumferential wall of said combustion chamber at a location between the point of fuel entry and the gas outlet; fly ash supply means for introducing a stream of air and fly ash in suspension axially into said combustion chamber, said last named means including means for collecting fly ash, a conduit disposed within and extending along the axis of said fuel inlet chamber and axially opening in the direction of said combustion chamber, and means for supplying the collected fly ash and air to said conduit for flow therethrough to said one end of the combustion chamber inwardly and axially of and separate from the whirling stream of primary air and fuel entering said combustion chamber; fluid cooled tubes for said combustion chamber walls proportioned for the maintenance of said refractory under a normal mean temperature in said combustion chamber above the fuel ash and fly ash fusion temperatures; and a slag outlet in the lower part of said combustion chamber.

2. A cyclone furnace having a combustion chamber of substantially circular cross-section defined by walls having an inner exposed refractory surface; a substantially circular fuel inlet chamber of smaller diameter than and axially opening into one end of said combustion chamber; means for introducing a stream of primary air and slag-forming particle fuel tangentially into said fuel inlet chamber at a high angular velocity and effecting a helical path of travel therein along the circumferential wall of said fuel inlet chamber; means defining a restricted gas outlet at the opposite end of said combustion chamber; means for introducing a high velocity stream of secondary air tangentially to the circumferential wall of said combustion chamber at a location between the point of fuel entry and the gas outlet; fly ash supply means for introducing a stream of air and fly ash in suspension axially into said combustion chamber, said last named means including means for collecting fly ash, a circular conduit disposed within and extending along the axis of said fuel inlet chamber and axially opening in the direction of said combustion chamber, and means for supplying the collected fly ash and air to said conduit for flow therethrough to said one end of the combustion chamber inwardly and axially of and separate from the whirling stream of primary air and fuel entering said combustion chamber; fluid cooled tubes for said combustion chamber walls proportioned for the maintenance of said refractory under a normal mean temperature in said combustion chamber above the fuel ash and fly ash fusion temperatures; and a slag outlet in the lower part of said combustion chamber.

3. A cyclone furnace having a combustion chamber of substantially circular cross-section arranged with its axis substantially horizontal and defined by walls having an inner exposed refractory surface; a substantially circular fuel inlet chamber of smaller diameter than and concentrically opening into one end of said combustion chamber; means for introducing a stream of primary air and slag-forming particle fuel tangentially into said fuel inlet chamber at a high angular velocity and effecting a helical path of travel therein along the circumferential wall of said fuel inlet chamber; means defining a restricted gas outlet at the opposite end of said combustion chamber; means for introducing a high velocity stream of secondary air tangentially to the circumferential wall of said combustion chamber at a location between the point of fuel entry and the gas outlet; fly ash supply means for introducing a stream of air and fly ash in suspension axially into said combustion chamber, said last named means including a hopper for collecting fly ash, a circular conduit disposed within and extending along the axis of said fuel inlet chamber and axially opening in the direction of said combustion chamber, means for supplying the collected fly ash from said hopper to said conduit, and means for admitting air under pressure into said conduit to flow fly ash therethrough to said one end of the combustion chamber inwardly and axially of and separate from the whirling stream of primary and fuel entering said combustion chamber; fluid cooled tubes for said combustion chamber walls proportioned for the maintenance of said refractory under a normal mean temperature in said combustion chamber above the fuel ash and fly ash fusion temperatures; and a slag outlet in the lower part of said combustion chamber.

4. A cyclone furnace having a substantially cylindrical combustion chamber defined by walls having an inner exposed refractory surface; a substantially circular fuel inlet chamber of smaller diameter than and axially opening into one end of said combustion chamber; a filler member of circular cross-section radially inwardly spaced from the circumferential wall of said fuel inlet chamber and defining therewith an annular space opening at one end to said combustion chamber; means for introducing a stream of primary air and slag-forming particle fuel into the annular space of said fuel inlet chamber at a high angular velocity and effecting a helical path of travel therein along the circumferential wall of said fuel inlet chamber; means defining a restricted gas outlet at the opposite end of said combustion chamber; means for introducing a high velocity stream of secondary air tangentially to the circumferential wall of said combustion chamber at a location between the point of fuel entry and the gas outlet; means for passing a whirling stream of tertiary air through the interior of said filler member axially of the whirling stream of primary air and fuel entering said combustion chamber; fly ash supply means for introducing a stream of air and fly ash in suspension axially into said combustion chamber, said last named means including means for collecting fly ash, a circular conduit disposed within and extending along the axis of said fuel inlet chamber and axially opening in the direction of said combustion chamber, and means for supplying the collected fly ash and air to said conduit for flow therethrough to said one end of the combustion chamber inwardly and axially of and separate from the whirling stream of primary air and fuel entering said combustion chamber; fluid cooled tubes for said combustion chamber walls proportioned for the maintenance of said refractory under a normal mean temperature in said combustion chamber above the fuel ash and fly ash fusion temperatures; and a slag outlet in the lower part of said combustion chamber adjacent the gas outlet for the continuous discharge of molten slag.

5. The process of burning and melting fly ash which comprises introducing a stream of air and slag-forming particle fuel in suspension at a high velocity into one end of a combustion chamber of substantially circular cross-section, while separately introducing a stream of air and fly ash into said one end of the combustion chamber inwardly and axially of the whirling stream of air and fuel entering said chamber and while maintaining a normal mean temperature in the chamber above the fuel ash and fly ash fusion temperatures, causing the fuel and air and fly ash so introduced to move axially of the combustion chamber towards the gas discharge end thereof through a helical path of travel along the circumferential wall of the combustion chamber of sufficient length to cause combustion of the fuel and the release of fuel ash in a condition to form a sticky surface on the circumferential wall to which fuel particles and fly ash particles adhere and are scrubbed by the combustion gases, causing the furnace gases to discharge from said gas discharge end of the combustion chamber, and collecting and withdrawing the ash separated in the combustion chamber and fly ash in a molten condition from the lower part of the chamber.

6. The process of burning and melting fly ash which comprises introducing a stream of air and slag-forming particle fuel in suspension at a high velocity into one end of a combustion chamber of substantially circular cross-section arranged with its axis substantially horizontal, while separately introducing a stream of air and fly ash into said one end of the combustion chamber inwardly and axially of the whirling stream of air and fuel entering said chamber and while maintaining a normal mean temperature in the chamber above the fuel ash and fly ash fusion temperatures, causing the fuel and air and fly ash so introduced to move axially of the combustion chamber towards the gas discharge end thereof through a helical path of travel along the circumferential wall of the combustion chamber of sufficient length to cause combustion of the fuel and the release of fuel ash in a condition to form a sticky surface on the circumferential wall to which fuel particles and fly ash particles adhere and are scrubbed by the combustion gases, causing the furnace gases to discharge from said gas discharge end of the combustion chamber, and collecting and withdrawing the ash separated in the combustion chamber and fly ash in a molten condition from the lower part of the chamber adjacent the gas outlet.

References Cited in the file of this patent

UNITED STATES PATENTS

| | | |
|---|---|---|
| 2,822,766 | McCullough | Feb. 11, 1958 |
| 2,847,979 | Sifrin et al. | Aug. 19, 1958 |

FOREIGN PATENTS

| | | |
|---|---|---|
| 508,727 | Belgium | Feb. 15, 1952 |
| 64,801 | France | July 6, 1955 |
| | (1st add. to No. 1,026,445) | |